Figure 1:
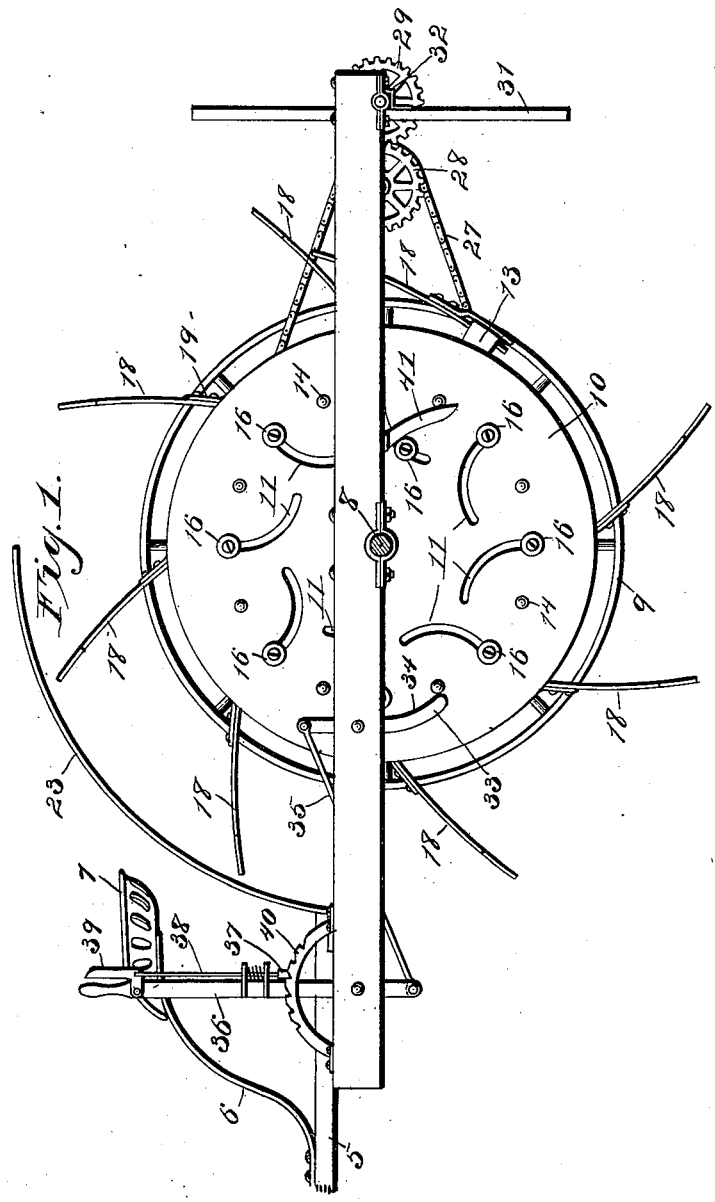

No. 639,752. Patented Dec. 26, 1899.
A. R. MISKIN.
SPADING MACHINE.
(Application filed June 13, 1899.)
(No Model.) 3 Sheets—Sheet 1.

WITNESSES
Louis D. Heinrichs.
Chas. S. Hyer.

INVENTOR
Arthur R. Miskin
By Victor J. Evans
Attorney

No. 639,752. Patented Dec. 26, 1899.
A. R. MISKIN.
SPADING MACHINE.
(Application filed June 13, 1899.)

(No Model.) 3 Sheets—Sheet 2.

WITNESSES
Louis D. Heinrichs
Chas. S. Hyer

INVENTOR
Arthur R. Miskin
By Victor J. Evans.
Attorney

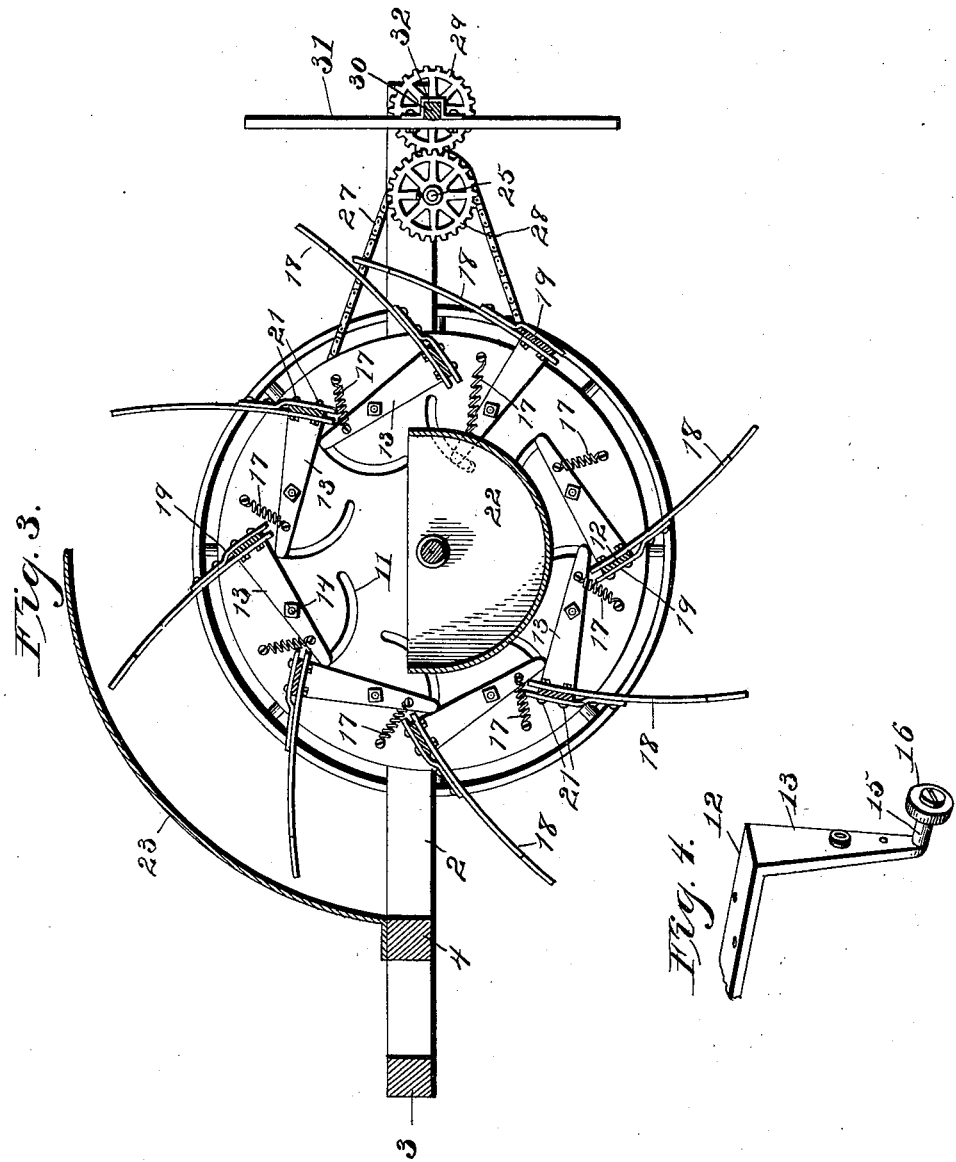

UNITED STATES PATENT OFFICE.

ARTHUR R. MISKIN, OF IDAHO FALLS, IDAHO.

SPADING-MACHINE.

SPECIFICATION forming part of Letters Patent No. 639,752, dated December 26, 1899.

Application filed June 13, 1899. Serial No. 720,386. (No model.)

*To all whom it may concern:*

Be it known that I, ARTHUR R. MISKIN, a citizen of the United States, residing at Idaho Falls, in the county of Bingham and State of Idaho, have invented certain new and useful Improvements in Spading-Machines; and I do hereby declare the following to be a full, clear, and exact description of the invention, such as will enable others skilled in the art to which it appertains to make and use the same.

This invention relates to a spading-machine, and contemplates a mechanical organization for cultivating or preparing the ground by digging it up through the medium of a series of successively-operating devices simulating spades and to replace plows as commonly used, with the advantage that the ground can be more expeditiously treated and simultaneously broken up or comminuted and require less after treating by means of harrows or analogous devices.

A further aim of the construction is to provide a device having a partial automatic operation and self-adjustment to insure a ground penetration and subsequent elevation and overthrow and thoroughly carry on such operation over an extended transverse surface and without the necessity of the labor involved in guiding and operating a plow or such other similar devices as now are commonly employed for the purpose of breaking up the ground or soil preparatory to seeding or planting.

The invention consists, essentially, of a frame supporting a driving axle or shaft supplied with ground-wheels, adjacent which are opposite supporting-heads confining movable spade-bars having spades extending therefrom and so disposed as to be regularly positioned in successive angular planes to insure a proper direction of penetration and an after elevation.

The invention further consists of a frame supporting a series of spades successively arranged and having rotating cleaners at one end to pass between the spades and relieve them of trash or other debris that may be carried upward thereby from the ground-surface.

The invention further consists of a frame supporting a series of rotating spades successively arranged in movable positions and adapted to be influenced during the course of their revolution by a stationary finger to relieve them of clinging soil and preserve them in a free condition to penetrate the unbroken ground at an opposite point.

The invention further consists of the details of construction and arrangement of the several parts, which will be more fully hereinafter described and claimed.

Figure 2:
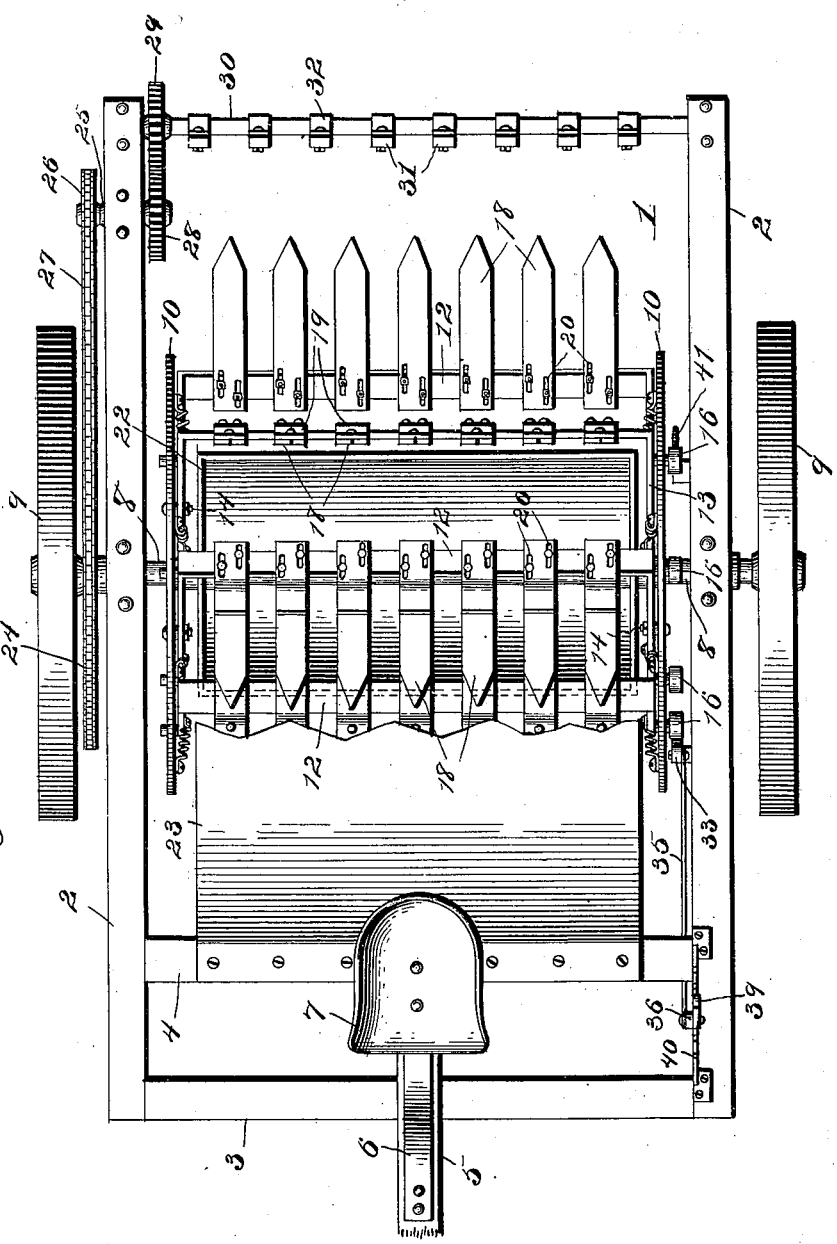

In the accompanying drawings, Figure 1 is a side elevation of a spading-machine embodying the invention. Fig. 2 is a top plan view of the same, showing a part thereof broken away. Fig. 3 is a longitudinal vertical section of the improved device. Fig. 4 is a detail perspective view of a portion of one of the spade-bars.

Referring to the drawings, wherein similar numerals are employed to indicate corresponding parts in the several views, the numeral 1 designates a supporting-frame which is composed of side bars 2, united by a front end bar 3. Slightly in rear of the front end bar and secured at its ends to the side bars 2 is a transverse supporting-bar 4, and therefrom over the center of the front end bar 3 a tongue 5 projects and has attached thereto the yielding arm 6 of an operator's seat 7. About midway of the side bars 2 and in suitable journals a driving axle or shaft 8 is rotatably mounted and has keyed to the opposite ends thereof, exterior of the said side bars, ground-wheels 9, which may be of any preferred form. On the said driving-axle, inside of the bars 2 a suitable distance, opposite heads 10 are fixed, and preferably of circular form, being constructed of thin metal having sufficient rigidity to serve the functions of a support.

As shown by Figs. 2 and 3, the heads 10 have substantially crescent-shaped slots 11 formed therein at a point about midway between the center of said heads and the peripheries of the same. These slots 11 are eccentric in their relation to their heads and regularly arranged respecting each other, being positioned proportionately to or in accordance with the dimensions of the heads and position the parts coacting therewith tangentially or so that they will be projected in planes to properly enter the ground-surface when brought into contact with the latter without drag or material resistance. Extending from one head 10 to the other are a series of spade-bars 12, which have right-angular end arms 13, connected to the said heads by pivot-bolts 14 passing through intermediate points thereof. The free ends of the arms 13 are reduced, as clearly shown at 14, and have studs 15 projecting outwardly therefrom in planes at right angles, and on the outer terminations of the studs rollers 16 are loosely mounted. The studs 15 project through and are movable in the slots 11 and are of such length as to position the rollers 16 on the exterior sides of the heads 10. All of the arms 13 are normally held at the outer extremities of the slots 11, and to maintain this disposition of the said arms coiled springs 17 are connected thereto and adjacent portions of the heads. By this normal position of the several arms the spade-bars 12 are held at a uniform oblique angle, and thereto at regular intervals a series of spades 18 are adjustably connected and have their outer ends pointed or reduced for easy penetration into the ground. The spades 18 are closely arranged and have bifurcate fingers provided by means of supplemental plates 19, bent up in part away from the inner ends of the spades, and the latter and said supplemental plates have slots 20 formed therein, as clearly shown by Fig. 2, to permit an adjustment of the spades and increase or decrease their projection relative to the bars 12 and the heads 10. The several spades are attached to the bars 12 by means of bolts 21, which pass through the slots 20 and are made fast or clamped by any suitable means, preferably nuts, as shown. The number of bars illustrated in the drawings are believed to be the best adapted to the function they are intended to perform, though it is obvious that in larger or smaller machines the number might be increased or decreased.

To give the machine sufficient tractive weight, a trough 22 is swung on the axle 8 and may be loaded with dirt or stone, the quantity of such contents varying the downward pressure on the ground of the entire device. This weight-trough holds the machine down normally against any elevating action that might ensue from the penetration of the spades into the ground, and also insures a full depression or invariable digging action, in view of the fact that the weight of the machine as an entirety, added to the auxiliary weight carried by the contents of the trough, will be in excess of any resistance that might be offered to the penetrating action of the said spades and caused by different conditions of the ground.

On the supporting-bar 4 in advance of the spades the lower front end of a shield 23 is secured and curves upwardly and rearwardly over the said spades to prevent any dirt that might be carried upward therewith from being thrown forward over the front portion of the frame or against the occupant of the seat 7.

On the axle 8 adjacent one of the ground-wheels 9 a large sprocket-wheel 24 is keyed, and at the rear of the adjacent side bar 2 a short shaft 25 is journaled and has fixed to the outer end thereof a sprocket-wheel 26. The sprocket-wheel 26 is materially reduced relatively compared to the sprocket-wheel 24 and both of these sprocket-wheels are traversed by an endless-chain belt 27. The inner end of the shaft 25 has a gear 28 fastened thereto, which meshes with a pinion 29 on a cleaner-shaft 30, journaled in opposite ends in the rear ends of the side bars 2. As shown by Fig. 3, this cleaner-shaft 30 is preferably squared, though analogous and well-known formations might be adopted, and secured thereto at regular intervals are cleaners 31, extended equally on opposite sides of the said cleaner-shaft by means of angular clips 32, secured to the centers thereof and embracing the said shaft. The cleaners 31 are so disposed as to rotate through the spaces between the spades 18, and the movements of the several series of spades and the said cleaners are in such timed relation that as the spades are brought around at a predetermined point the cleaners will rapidly pass between the spades and relieve them of trash or debris that may be elevated from the ground thereby, the said cleaners operating first at one side with one set of spades and then in alternation at the opposite side with a succeeding set of spades, and so on through the whole series of spades. The cleaner is preferably in the form of a rectangular bar less in width than the distance between each pair of spades.

The rollers 16, as previously indicated, are normally exposed on the outer sides of the heads 10 in circular alinement, and at different times it may be necessary to vary the angle of penetration of the spades 18 or to entirely clear them from entrance into the ground-surface. To accomplish this, a regulator 33 is pivotally attached to the inner edge of one of the side bars 2 and consists of an arm having a lower curved end 34, which may be adjusted to lie in the path of rotation of the said rollers 16. To the upper end of this arm a connecting-rod 35 is movably secured and extends forward to the lower end of a shifting lever 36, carrying a spring-actuated dog 37, having an operating-rod 38 attached at its upper end to a movable angle-bar 39. The dog 37, as in other devices of a similar nature, is adapted to engage the teeth of a sector 40, and in operation a forward movement or shift of the lever 36 will force the connecting-rod 35 rearward and clear the lower curved end of the regulator 33 from contact with the rollers 16. A reverse movement of the lever 36 will cause the connecting-rod 35 to pull on the upper end of the regulator 33 and throw the lower end of the regulator in the path of movement of the rollers 16, and under this adjustment said rollers will strike the curved end of the regulator and be depressed and through the studs 15 move the arms 13 inward and tilt the spade-bars 12 in the same direction, and consequently draw the spades in closer to the peripheries of said heads. This angle and indrawing of the spades will be regulated by the rearward projection of the lower curved end 34 of the regulator, and the adjustment of the arms 13 and bars 12 in the manner stated will be against the resistance of the springs 17. By a complete forward shifting of the lever 36 the regulator will be thrown far enough rearward at its lower end to close the spades 18 completely inward the full limit allowed by the relative proportions of the several parts, and the outer ends of the spades will be prevented from entering the ground, as their angle will be such that they will pass over the ground-surface. When a partial adjustment of the spades is made in the manner specified, they will have a more shallow penetration than when the regulator is clear of the rollers 16, and this shallow penetration will be assisted by the curvature of the several spades, as will be obviously apparent. The part of the regulator which depends below the side bar 2, to which it is pivoted, is long enough to hold the spades until they enter the ground in the case of a more shallow adjustment than the normal projection or to clear the said ground when the machine is being transported from one point to another and not in operation. On the same side bar 2 to which the regulator 33 is pivoted a stationary guard depends at a suitable rearward angle and is also in the path of movement of the rollers 16. The function of this guard is to throw the spades in such position as they leave the ground that dirt or debris that may be clinging thereto may be relieved therefrom, and as the several rollers 16 come around and contact with the guard 41 they first strike the lower end of the latter and then ride over the front edge, which is curved, and act as a cam, shoving the rollers and the arms 13 through the studs 15, as well as the bars 12 inward toward the center of the head and against an action of the springs 17. The rollers continue in engagement with the said guard until they entirely clear the upper end of the same, and immediately after such clearance the springs 17 exert their resilient action and suddenly force the spades outwardly, thereby vibrating them to such an extent as to thoroughly cleanse them from all clinging material. At this time also, the cleaners 31 are operating between the successive sets of spades, and thus said spades are entirely cleansed from all matter that might tend to obstruct their usefulness.

In the operation of the two series of spades they first come around and strike the ground-surface and are gradually depressed by the weight of the machine and the auxiliary weight established by the contents of the trough 22. The heads 10 being continuously revolved, the spades are constantly forced rearward and their angle changed in accordance with the position in advance of or rearward beyond the vertical plane of said heads. When the spades become fully penetrated in succession, a lifting action begins and a subsequent updrawing and overthrow, thus thoroughly breaking up the surface of the ground and in view of the close arrangement of the spades also completely comminuting the lumps and making the surface less broken and irregular than it would be after the use of an ordinary plow. Thus the spades are normally projected at equal distances and maintain such distances continuously, and when in working position with the ground over which they travel the rapidity of the rotation of the ground-wheels 8 will necessarily control the expeditious breaking up of the ground by bringing the spades in more rapid contact therewith. By removing the guard 41 and changing the angles of the arms 13 with relation to the spade-bars 12, thereby changing the angles of the spades, so that they project nearly straight from the center, the machine may be used as a subsoiler. When operating as a subsoiler, the ground is not lifted and turned, as is the case in the usual operation of the machine.

As a means of propelling the machine horse or other power may be utilized, and the spades in their rearward movement begin to leave the ground when they point backwardly, and as the said ground is loose at this time less resistance is offered to the upward movement of the spades, which will take place at about the time that another set in advance of the central vertical plane of the heads are being penetrated or depressed, and thereby avoid or decrease at least as much as possible a double resistance on opposite sides of the center. It also lightens or diminishes the weight, and the several sets of spades on leaving the ground soon come in contact with the finger 41, which serves as a trip and will also elevate all trash or debris that might serve as a drag by the cleaners 31.

Though the best form of the device has been illustrated and descriptively disclosed, it is obviously apparent that changes in the proportions, dimensions, and minor details of construction might be resorted to to accommodate it to different kinds of work without departing from the nature or sacrificing any of the advantages of the invention.

Having thus described the invention, what is claimed as new is—

1. In a spading-machine, the combination of a frame, rotatable slotted devices carried thereby, spring-actuated spade-supports having projections extending through the said slotted devices, spades on the supports, a regulator to vary the degree of projection of the spades and control the depth of penetration of the same, a rear trip-finger with which the projections of the spade-supports are also adapted to contact, and means for cleansing the spades.

2. In a spading-machine, the combination of a frame, a driving-axle journaled therein and provided with ground-wheels, opposite heads fixed to the axle and having a series of regularly-arranged slots therein, spade-bars between the heads and having angular arms at the ends carrying studs passing through the slots and supporting-rollers on their outer ends, springs attached to the arms to hold the same in normal position, spades carried by the spade-bars, an adjustable regulator adapted to contact with the said rollers to vary the degree of penetration of the spades or to close them inward to avoid penetration, a trip-finger to act on the spades after penetration, and a rotatable cleaning device at the rear of the heads which has movement through the spaces between the spades.

3. A spading-machine, comprising opposite rotatable supports having slots therein, in regular sequence, a series of spade-bars coextensive with the distance between the said supports and having arms pivoted to the supports, springs for maintaining the arms and spade-bars in normal position, spades adjustably mounted on the said bars, and means for moving the spade-bars to regulate the depth of the penetration of the same and also to relieve them of clinging ground or soil.

In testimony whereof I affix my signature in presence of two witnesses.

ARTHUR R. MISKIN.

Witnesses:
JAMES THOMAS,
EDWIN E. MISKIN.